United States Patent Office 3,448,716
Patented June 10, 1969

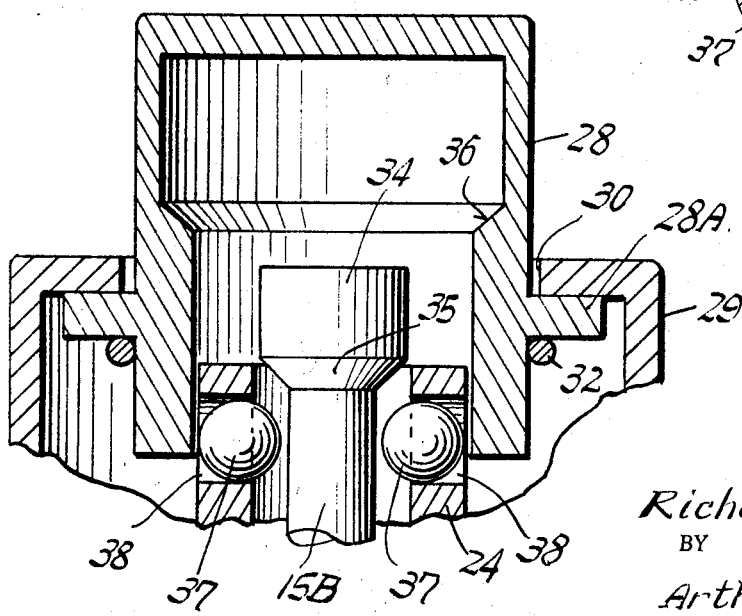

3,448,716
MAGNETIC PRESSURE INDICATOR
Richard G. Smith, Lake Hiawatha, N.J., assignor, by mesne assignments, to Commercial Filters Corporation of California, Inc., Compton, Calif., a corporation of California
Filed Oct. 23, 1965, Ser. No. 503,918
Int. Cl. G01l 19/12
U.S. Cl. 116—70                                  3 Claims This invention relates in general to a fluid pressure indicating device, and particularly to a pressure indicator of the character adapted to be used in conjunction with the fluid pressure system having an area of high pressure and an area of low pressure to indicate the occurrence of a pressure differential therebetween which is greater than that of a predetermined value.

More specifically this application is directed to improvements in the type of magnetic pressure indication disclosed in my U.S. Patent No. 3,154,049.

The pressure indicator of this invention may be utilized in conjunction with a hydraulic system in which a fluid, such as oil, passes through a filter or screen. The screen in such systems inherently resist the flow of fluid therethrough and thereby creates a difference in the amount of pressure present on opposite sides of the screen, as for example, from high to low in the direction of flow. The pressure drop across the screen accordingly increases in proportion to the accumulation of dirt or foreign matter collecting on the screen, which further resists the flow therethrough. If a pressure indicator is placed into such a system to communicate with the fluid flowing on opposite sides of the screen, and it is set to tolerate only a predetermined differential between the pressures on either side of the screen, an indication of any increase in the pressure differential can be obtained. Such an indication is desired as a warning to show that the filter screen has accumulated foreign matter to such an extent as to require replacement or cleaning in order to obtain the optimum effeciency of the system.

An example of a specific application for such pressure indicating device as in the aircraft and missile fields. In these fields exacting sets of specifications requires that such indicator unit must conform to establish standards. Such standards may require that the unit be nonelectric, and that the indicating element thereof be visible in the indicating position and invisible in a nonindicating position.

Heretofore, pressure indicator devices of the type to which this invention relates were constructed so that for certain applications the force required to actuate the indicator button had proven to be too low. Consequently, an object of this invention is to provide a pressure indicating means constructed and arranged so as to increase the button force by a substantial factor without sacrificing resistance to vibrations.

Another object of this invention is to provide a pressure differential indicator which can be manually reset, and which in the reset position is positively locked in place.

Another object of this invention is to provide an improved pressure differential indicator having a minimum of moveable parts than can be subjected to wear and/or deterioration.

Another object of this invention is to provide a magnetic pressure indicator in which the indicating means is movably disposed between a pair of magnets, both acting thereon, whereby a movement of one magnet away from the indication means brings the indicating means under the influence of the other magnet.

Another object of this invention is to provide a magnetic pressure indicator with means for positively maintaining the indicating means in the inoperative position, and which indication means is released automatically upon a change in the pressure differential acting on the system.

The foregoing objects and other features and advantages are attained by the pressure differential indicator which is adapted for use in a fluid pressure system having a source of high pressure and a source of low pressure. The pressure indicator comprises generally a housing which is divided into a fluid pressure chamber and a chamber adapted to house the indicating means. A movable piston means is slidably disposed within the fluid pressure chamber. Accordingly, the piston divides the pressure chamber into a low pressure compartment and a high pressure compartment. The piston means include a magnetic element disposed adjacent the chamber of the indicating means. Means are provided for normally biasing the piston means toward close proximity to the chamber housing the indicating means so that the piston magnetic element is normally presented thereto.

A fixed magnet is mounted in the indicating chamber in spaced relationship with respect to the magnetic element of the piston means, with the indicating means movably disposed beween the fixed magnet and the movable magnet. The indicating means includes an armature having a stem projecting upwardly through an opening formed in the housing. The arrangement is such that the armature is normally attracted to the piston means magnet, but is always under the influence of the magnetic field of the fixed magnet. Accordingly, the movable piston magnet has a stronger field or flux than that of the fixed magnet which in the normal position will attract the armature thereto.

Operatively associated with the stem of the armature for movement between an extended indicating position and a retracted non-indicating position is an indicating button. A spring means is provided for normally biasing the indicating button toward its extended indicating position. Means are also provided for positively locking the indicating button against the force of the spring biasing means, to the end of the armature stem until the armature is displaced due to the attraction of the fixed magnet acting thereon. This occurs when the movable piston and connected magnet is displaced due to a change in the pressure differential acting on the system. When this occurs the movement of the armature effects an automatic release of the locking means thereby causing the indicating button to be extended to its operative indicating position due to the influence of the spring means acting thereon. Means are also provided for limiting the movement of the button in the extended indicating position thereof. To reset, the indicating button is manually displaced so that the armature is again brought under the influence of the movable magnet of the piston means.

A feature of the invention resides in a novel locking means for positively retaining the indicating button against the bias of the spring acting thereon in the normal nonindicating position of the indicator during the normal operation.

Another feature of this invention resides in the provision of the locking means which is automatically released to effect the extension of the indicating button when there is a change in the pressure differential acting on the system which is greater than that of a predetermined value.

Another feature of this invention resides in the provision wherein the indicating button can be manually reset in a relatively simple positive manner.

Other features and advantages will become more readily apparent when considered in view of the drawings and specification in which:

FIG. 1 is a cross-sectional view of the magnetic pressure indicating device of the instant invention in which the solid line showing illustrates the device in the inoperative nonindicating position, and the dot-dash line indicates the position of the parts in the operative indicating position of the device;

FIG. 2 is a cross-sectional view taken along the line 2—2 of FIG. 1; and

FIG. 3 is an enlarged fragmentary sectional side view the novel locking means of this illustrated embodiment showing the indicating button, the released or indicating position;

Referring to the drawings, there is shown in FIGS. 1 through 3 the pressure indicator device 10 of the instant invention. As shown the pressure indicator device 10 comprises a housing or body 11 which is divided by a partition wall 12 into a fluid pressure chamber 13 and a chamber 14 for housing the indicating means 15 of the device. If desired a mounting flange 16 may be integrally formed on the body 11. Movably disposed within the fluid pressure chamber 13 of the housing 11 is a piston 17 which has its lower end exposed or in communication with the low pressure side of the fluid system utilizing the instant pressure indicating device 10. The upper end of the piston 17 is in communication by way of a passageway 18, to the high pressure side of the system.

In accordance with the invention a permanent magnet 19 is connected to the piston so that the end of the magnet in the normal position is disposed adjacent or in close proximity with the central partition of the body. A coil spring 20 is provided for normally urging the piston 17 and the connected magnet 19 toward the partition 12 so that poles 21 of the magnet are normally disposed adjacent or contiguous to the central partition 12. Suitable sealing means 22 are provided to assure a fluid tight seal between the piston 17 and the body 11 of the device.

Within the indicating chamber 14 of the body there is disposed an annular ring or cylinder 23 to define a spacer and support for closure member or cap 24. The closure member 24 is formed with a central opening 25 and a cylindrical race extending upwardly therefrom and circumscribing the opening 25. The arrangement is such that the peripherial portion of closure flange 24A rests upon the upper end of the spacer ring 23. In this embodiment, a base 26 extends inwardly to chamber 14 to circumscribe the cap opening 25.

An annular permanent magnet 27 is disposed against the underside of the closure flange 24A. Accordingly, the fixed magnet 27 is spaced a predetermined distance above the partition 12.

In accordance with this invention the indicating means 15 is movably disposed within chamber 14. The indication means comprises an armature having a disc shaped head portion 15A and a connected stem portion 15B. The head portion 15A is formed of a magnetically attractive material which is readily subjected to the magnet fields of the magnets 19 and 27 acting thereon; as will be hereinafter described. The stem portion 15B extends upwardly through the opening 25 and the race 26 circumscribing it.

Operatively associated with the stem 15B is an indicating button 28. As shown the button is mounted within a button housing 29 secured to the body 11 of the device 10. The top of the housing 29 is provided with an opening 30 through which the button may extend when moved to this operative indicating position; as shown in FIG. 3. The housing 29 comprises a cup-shaped member having a lower flange 29B which rests in a counterbore formed in the top of the body 11. Accordingly a suitable lock or retainer ring 31 engaging the flange portion 29B holds the housing 29 in position to the body.

As shown, the indicating button 28 is defined as an inverted cup-shaped member slidably mounted over race 24 and is formed with a laterally extending flange 28A intermediate the ends thereof. The arrangement is such that the flange 28A defines a shoulder against which one end of a coil spring 32 is urged. The coil spring 32 circumscribes the lower portion of the indicating button 28 and is therefore normally compressed between the closure 24 and the flange 28A of the button 28. Thus the spring 32 normally exerts a force on the button 28 tending to urge it toward its operative extended position.

As seen in FIGS. 1 and 3 the upper end of the armature stem 15B is provided with an enlarged head portion 34. The enlarged head portion 34 is connected to the stem 15B by means of a tapered transition or conical portion 35 the sides of which taper upwardly and outwardly. Accordingly, the O.D. of the enlarged head-end portion 34 is substantially equal to the I.D. of the race 24 so as to render the head-end 34 freely slidably with an internal inclined shoulder surface 36 circumscribing the inner periphery thereof to provide a camming surface as will be hereinafter described.

In accordance with this invention the locking means are interposed between the indicating button 28 and the stem 15B of the armature so as to effect locking and unlocking of the indicator button with respect to the stem 15B. The locking means includes ball detents 37 which are retained in appropriate opening 38 formed in the race 24. The arrangement is such that the ball detents have limited lateral movement toward and away the actuating stem as will be hereinafter described.

Referring to FIGS. 1 and 3, it will be noted that in the inoperative or retracted position of the indicating mechanism, the side surfaces of the enlarged portion 34 of the armature is disposed opposite the ball detents and accordingly tend to cam the locking balls 37 outwardly as shown. The internal inclined shoulder 36 of the indicating button 28 in the retracted position thereof is disposed below the ball detent 37 and consequently maintain the button 28 locked in retracted position. As long as the armature 15 is attracted to magnet 19 are shown in FIG. 1, the ball detents 37 cam outwardly with respect to the race openings 38 to positively lock the button 28 to the head-end of the stem, and against the bias of the spring 32 acting thereon. When the armature 15 is primarily influenced by magnet 27 and is disposed inwardly, the head-end portion 34 of the stem is extended beyond the top of the ball detent 37, thereby causing the shoulder cam 36 of the indicating button 28 to cam the ball detents 37 inwardly to a position shown in FIG. 3 as the head-end portion 34 moves beyond the race 24. Thus the inwardly movement of the balls 37 unlocks the button 28 from the stem 15B, and the force of the spring 32 acting thereon causes the button 28 to extend to the protracted position. The armature is thus actuated whenever a pressure differential occurs in a system which causes the piston 17 and movable magnet 19 to move away, or downwardly as seen in FIG. 1, from the central partition 12 an amount sufficient to cause flux of the fixed magnet 27 to overcome the magnetic force of the movable piston magnet 19.

The flange 28A on the button 28 engaging the internal flange 29A of the button housing 29 will serve to limit the operative or protracted position of the button 28.

To reset the device, the button 28 is depressed from the position shown in the dotted line in FIG. 1 to its solid line position. In doing so contact between the button 28 and inclined surface 35 on the head-end 34 of the armature cause the armature 15 to be displaced downwardly to the point where it is again brought under the influence of the movable magnet 19 cam retained in its inoperative position. In moving downwardly, the inclined transition portion 35 of the head-end portion of the stem functions to cam the ball detents 37 outwardly, to lock the button 28 in the retracted position as shown in FIG. 1.

It will thus be apparent that whenever the movable magnet 19 is moved a sufficient distance from the base or bottom 15A of the armature, the flux of the fixed magnet 27 overcomes that field of the movable magnet causing the armature 15 to be displaced upwardly and thereby effect automatic release of the indicating button due to the communications described.

Variations and modifications may be made without departing from the spirit of the invention or the scope of the appended claims.

I claim:
1. A differential pressure indicator for use in a fluid pressure system having a source of high pressure and a source of low pressure comprising:
   (a) a housing;
   (b) a partition means dividing said housing into two chambers;
   (c) one of said chambers defining a fluid pressure chamber and the other of said chambers adapted to house an indicating means;
   (d) a movable piston means disposed within said fluid pressure chamber for dividing said pressure chamber into a low pressure compartment on one side of said piston means and a high pressure compartment on the other side of said piston means;
   (e) said piston means including a magnetic element disposed opposite said partition and mounted for movement with said piston;
   (f) means for normally urging said piston means toward close proximity to said partition means whereby said magnetic element is normally presented adjacent to said partition;
   (g) a fixed magnet mounted in spaced relationship with said partition in said other chamber, said fixed magnet facing said partition;
   (h) an armature disposed between said fixed magnet and partition for movement therebetween;
   (i) said armature having a stem projecting upwardly through an opening formed in said fixed magnet; an enlarged head at the top of the stem;
   (j) said armature being normally attracted to said movable magnet, but subject at all times to the magnetic field of said fixed magnet;
   (k) an indicating button mounted over the end of said stem for movement between an extended indicating position and a retracted nonindicating position; the button having an interior annular flange defining a shoulder;
   (l) a spring means normally biasing said button toward its extended indicating position;
   (m) sleeve means disposed between the button and the armature, the sleeve means contacting a plurality of ball means, the ball means being maintained in contact with the annular flange by means of the enlarged head movement of the armature upwardly permitting the ball means to disengage the annular flange and contact the stem of said armature;
   (n) and means for limiting the movement of said button in the extended indicating position thereof.

2. The invention as defined in claim 1 wherein said locking means includes a ball lock means operatively connected between said stem and said button to lock said button to said stem in the retracted position thereof to said stem.

3. The invention as defined in claim 2 wherein said ball lock means includes:
   (a) means defining a race;
   (b) a ball displaceably mounted in said race;
   (c) and cooperating cam surfaces formed on said stem and said button to effect displacement of said balls to lock or release of said button relative to said stem.

References Cited

UNITED STATES PATENTS

| | | | |
|---|---|---|---|
| 3,232,266 | 2/1966 | Levesque | 116—70 |
| 2,669,707 | 2/1954 | Ehrman. | |
| 2,878,936 | 3/1954 | Scavuzzo et al. | |
| 2,935,040 | 5/1960 | Steensen. | |
| 2,942,572 | 6/1960 | Pall. | |
| 2,948,151 | 8/1960 | Astl. | |
| 2,954,751 | 10/1960 | Barnes. | |
| 3,011,470 | 12/1961 | Stoermer. | |
| 3,045,826 | 7/1962 | Howard et al. | |
| 3,070,232 | 12/1962 | Casaleggi. | |
| 3,077,176 | 2/1963 | Pall et al. | |
| 3,077,854 | 2/1963 | Pall. | |
| 3,080,972 | 3/1963 | Smith. | |
| 3,117,550 | 1/1964 | Cole. | |
| 3,119,367 | 1/1964 | Barnes et al. | |
| 3,125,062 | 3/1964 | Rauff et al. | |
| 3,128,743 | 4/1964 | Whiting. | |
| 3,140,690 | 7/1964 | Siebel. | |
| 3,154,049 | 10/1964 | Smith et al. | |
| 3,187,711 | 6/1965 | Campolong. | |
| 3,212,471 | 10/1965 | Willis. | |

LOUIS J. CAPOZI, *Primary Examiner.*

U.S. Cl. X.R.

210—90